UNITED STATES PATENT OFFICE.

MORIZ WEINRICH, OF ST. LOUIS, MISSOURI.

PURIFICATION AND MANUFACTURE OF SUGAR.

SPECIFICATION forming part of Letters Patent No. 455,675, dated July 7, 1891.

Application filed August 15, 1890. Serial No. 362,104. (No specimens.)

*To all whom it may concern:*

Be it known that I, MORIZ WEINRICH, of St. Louis, in the State of Missouri, have invented certain new and useful Improvements in the Purification and Manufacture of Sugar; and I do hereby declare that the following is a full, clear, and exact description thereof, which will enable others skilled in the art to which it appertains to make and use the same.

My invention relates to the filtering and purification of saccharine solutions or other solutions or liquids—such, for instance, as water, beer, oil, alcohol, &c.—in order to separate in a quick and easy way all matters held in suspension, and in some cases to improve also the color and purity of the treated liquids. In order to attain these objects, I treat the sugar solutions with any one of the following materials or with mixtures of them: first, with bagasse, pressed sugar-cane, or exhausted cane-chips comminuted to a meal or flour; second, with the crude cobs or the crude stalks of the Indian corn (maize) comminuted to a meal or flour; third, with the charred cobs of the Indian corn comminuted into small pieces like bone-charcoal or ground to a meal or flour.

In treating sugar solutions with meal or flour of bagasse, corn-cobs, (crude or charred,) cornstalks, or mixtures of these materials I go on in the following way: The solution is heated up to about 180° Fahrenheit, and then receives, according to its purity, an addition of from two to six per cent. (relatively to the sugar contained in it) of one of the above-named materials. The main part of the filtering material can consist of the same material which may have already been used, and then cleansed by washing with water, and only a small portion of the fresh filtering material has to be added. The liquid, with the added material, is now carefully stirred and heated up to boiling-point. In most cases, especially if the purity of the liquid is low, I prefer to add some lime to the solution and neutralize it by phosphoric acid, sulphurous acid, or carbolic acid, as the purity will become increased in this way and the so-formed precipitate can become, by means of the filtering material, easily separated from the liquor. In separating the liquor treated in this way from the added filtering material and from all the scum and impurities contained in it I use three different methods, each and all of which work satisfactorily.

By the first method the liquor, after being kept hot, is pumped under continuous stirring through filter-presses. The liquor is kept hot in the tank or vessel in which it was mixed with the filtering material, and stirred in this tank while and until the mixture is pumped out of it and driven through filter-presses, which perform the separation of the liquor and all suspended matter contained therein. The liquor runs off clear and bright. The cakes which will form in the press, consisting of the filtering material and all the scum and slime, are lixiviated in the usual way, then taken out, and all the scum removed from the material by careful washing, and it is then ready to be used again.

*Second method.*—The liquor is treated in a cylindrical tank with a false bottom consisting of perforated sheet-iron covered with a filter-cloth, which is packed tight against the side of the tank. Beneath this tank stands another tank of the same capacity, and which is closed air-tight and is connected with the bottom of the upper tank by a pipe. In the lower tank a vacuum is produced by any ordinary air-pump. As soon as the liquor is treated in the above-described way the pipe connecting the two tanks is opened and the liquor is sucked through the cloth and false bottom by means of the vacuum into the lower tank. At the same time all filtering material, scum, and impurities will settle upon the cloth. When all the liquor has passed into the lower tank, water is put upon the sediment on the cloth, in order to lixiviate it. This done, the filtering material is taken out, washed, and used again. In order to insure an entirely bright and clear liquor, the latter is allowed to pass before it goes to the charcoal-filters through filter-presses with very little pressure.

*Third method.*—The treated liquor is run through a centrifugal machine, which effects the separation of the liquor from the filtering materials and the impurities. For this purpose I employ a centrifugal machine of any known or desired construction suitable for accomplishing this end.

At such places where bagasse can be obtained at low prices it is advisable to use fresh material every time, in order to save the washing expenses for the used material, and because the sugar contained in it will generally pay well for the fuel value of the bagasse and the expenses for drying and grinding. Besides, fresh material is always more efficacious than used material. On sugar-cane plantations the bagasse-meal could be prepared in such a way that it is sifted out of the bagasse and used in its moist state at once before it is getting sour. In this way the drying and grinding are saved; but I generally prefer to have the bagasse dried and ground as fine as possible, as it will be the more efficacious the finer it is ground.

Bagasse-meal is used without any further preparation; but fresh crude cob-meal or corn-stalks, before they are used, have to be boiled in water for about an hour in order to remove all coloring and extractive matters before they are brought in contact with sugar solutions.

The charred corn-cobs broken into small pieces offer an enormous filtering-surface, possessing, besides, a pretty tough and hard structure. They will form, therefore, a cheap and useful substitute for bone-charcoal, and are used in the same way as the latter material.

The materials I make use of are Indian corn or maize, (*Zea mays*,) sugar-cane, and sorghum, (*Sorghum saccharatum* or *Holcus saccharatus*,) which all belong to the family of the grasses, (*Gramineæ*), and especially to that kind of grasses, the stem or stalk of which is not (like wheat, oats, barley, &c.) empty or hollow, but, on the contrary, is filled with a vegetable material in the nature of a pith or marrow. This pith of grasses, including the cobs of corn, being exceedingly porous, is especially well adapted to take up and retain all suspended matter when brought into contact with solutions containing such matter. The materials in their crude or uncharred form have only a mechanical action; but if charred they will also to a certain degree decolorize, especially when treating water or alcohol.

I claim—

1. As a material for the filtration of sugar solutions or other solutions or liquids, the fiber, crude or charred, of the described grasses whose stalks or stems have an internal marrow or pith.

2. As a material for the filtration of sugar solutions or other solutions or liquids, the comminuted stalks and cobs of Indian corn, crude or charred.

MORIZ WEINRICH.

Witnesses:
C. C. HARTMAN,
WM. STEPHAN.